United States Patent Office 2,852,514
Patented Sept. 16, 1958

2,852,514
THIOPHOSPHORIC ACID ESTERS AND THEIR PRODUCTION

Gerhard Schrader, Wuppertal-Cronenberg, and August Dörken, Wuppertal-Sonnborn, Germany, assignors to Farbenfabriken Bayer Aktiengesellschaft, Leverkusen, Germany, a corporation of Germany No Drawing. Application May 2, 1957
Serial No. 656,493

Claims priority, application Germany May 19, 1956

4 Claims. (Cl. 260—247.1)

The present invention relates to and has as its object new and useful thiophosphoric acid esters as well as their preparation. Generally, these esters may be represented by the following formula:

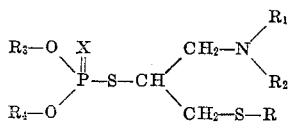

in which R stands for any aliphatic or aromatic radicals, $R_1$ and $R_2$ stand for lower aliphatic radicals (together with N, $R_1$ and $R_2$ may also form a cyclic amine which furthermore may contain hetero-atoms, thus yielding a pyrrolidine-, piperidine-, morpholine-, piperazine ring or the like), $R_3$ and $R_4$ stand for aliphatic radicals especially lower aliphatic radicals having from 1–4 carbon atoms, and X stands for oxygen or sulfur.

Thiophosphoric acid trialkyl esters which contain in one of their alkyl groups a mercapto alkyl substituent have become known as very effective insecticides during the last years. An outstanding representative of this class is for example the 0.0-diethyl-S-ethyl mercapto ethyl thionophosphate.

It has now been found that excellent insecticides of the above shown formula may be obtained by reacting salts of 0.0-dialkyl thiolophosphoric or dithiophosphoric acids with 1-(substituted amino)-3-(substituted mercapto)-2-halogen propanes. For better explanation this reaction may be seen from the following scheme using 1-(dimethyl-amino)-3-(ethyl-mercapto)-2-chloro propane and the ammonium salt of 0.0-diethyl-dithiophosphoric acid as reactants:

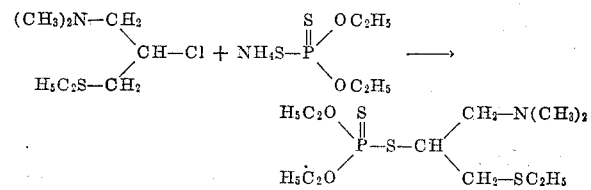

It has to be understood, however, that also other salts of 0.0-dialkyl thiophosphoric acids as well as of dithiophosphoric acids such as the sodium salt may successfully be used for completing this reaction. Other dialkyl esters include especially the dimethyl, diisopropyl, di-n-propyl and dibutyl phosphoric acid ester halides. As examples of appropriate substituted 2-halogen propanes there may be mentioned such compounds which contain in 1-position instead of a dimethyl amino group a diethyl, diisopropyl, dibutyl amino radical, a pyrrolidino, pyrimidino, piperazino, morpholino, thiomorpholino radical and the like. Instead of the ethyl mercapto groups in said compounds there may be present also a methyl-mercapto, phenyl-mercapto, p-chlorophenyl-mercapto, p-nitrophenyl-mercapto group and the like.

The reaction generally is carried out in inert solvents such as water, methanol, ethanol, acetone, methylethyl ketone, benzene, toluene, xylene and the like. Usually the reaction temperature has to be between about 0° and 100° C. especially between about 20–80° C.

The preparation of the starting materials is known from the literature or proceeds in an analogous manner to well known reactions. Thus the reaction of epichlorohydrine with mercaptane is known from Nenitzescu and Scarlatescu, Berichte de deutschen chemischen Gesellschaft, vol. 68, page 587 (1935), or from Pollard and Rietz, J. Am. Chem. Soc., vol. 72, page 4000 (1950). The further reaction of the mercapto-propylene-oxides with appropriate amines also proceeds according to known methods and is described e. g. in J. Am. Chem. Soc., vol. 71, page 1478 (1949) from Gilman and Fullhart. If some starting materials are not described in the above said literature, then their preparation proceeds exactly to the methods described there and using only the corresponding molecular amounts of starting materials without changing the reaction conditions.

The reaction between the alcohols of Gilman and Fullhart and appropriate halogenating agents to yield the 1-(substituted amino)-3-(substituted mercapto)-2-halogen-propanes may be carried out preferably in methylene chloride or ethylene chloride and with thionyl chloride as halogenating agent. The yields are almost quantitatively.

The compounds of the present invention are generally valuable insecticides and plant-protecting agents. They kill pests such as aphids, flies and mites and exhibit a very remarkable systemic action. The application of these compounds should be carried out according to the use of other known phosphor insecticides, i. e. in dilution of solution with solid or liquid carriers such as chalk, talc, bentonite, water, alcohols, liquid hydrocarbons, etc. The inventive compounds may further be used in combination with other known insecticides or pesticides, etc. Effective concentrations of the compounds may vary also; generally, concentrations of 0.0001% to 1.0% kill pests effectively. The combinations of the compounds may be sprayed or dusted or otherwise brought in contact with pests or plants to be protected. They may also be used as aerosols. The compounds of the present invention are of special advantage for combating sucking insects such as caterpillars. They exhibit also a very remarkable acaricidal activity. Furthermore, they may be used especially for combating mosquito larvae.

As a special example for the utility of the inventive compounds S-(2-[phenyl-mercapto] - 1 - [dimethylamino methyl]-ethyl)-0.0-diethyl thiolphosphate is dissolved in the same amount of acetone. After the addition of 30% by weight of benzene hydroxy diphenyl polyglycol ether (having 15 glycol radicals in the chain) this solution is diluted with water to a concentration of active ingredient indicated in the table below. The activities are the following ones:

Spider mites _____ 0.001
Systemic action on caterpillars _____ 0.1

Example 1

Equimolecular amounts of 1-dimethylamino-3-thiophenyl-2-hydroxy propane and thionyl-chloride are dissolved in 2 parts by volume of methylene-dichloride in the cold. After standing over night the reaction is completed by gently warming to boiling. The 1-dimethylamino-3-thiophenyl-2-chloropropane is obtained in 91% yield; B. P. 0.01 mm. Hg at 78° C.

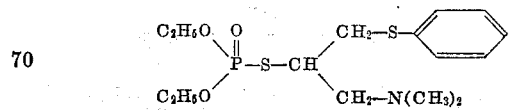

34.2 grams of 1-dimethylamino-3-thiophenyl-2-chloropropane are added while stirring to 28 grams of the ammonium salt of diethylthiol-phosphoric acid. The ammonium salt is dissolved in 30 ccm. methylethyl ketone. The temperature is kept for 8 hours at about 75° C., then the separated ammonium salt is filtered off with suction. The solvent is removed from the filtrate by distillation in vacuo. The reaction product obtained is dissolved in 100 ccm. ether, washed with water, and dried with sodium sulfate. The ether is evaporated and there are obtained 35 grams of the new ester as a water-unsoluble yellow oil. Yield: 45.5% of the theoretical.

*Analysis.*—(Mol. weight 363.4). Calculated: P=8.5%; S=17.6%; N=3.7%. Found: P=7.9%; S=17.4%; N=3.6%.

A 0.001% solution of the ester kills spider mites 100%. Caterpillars are killed completely with solutions containing 0.1% of the ester.

*Example 2*

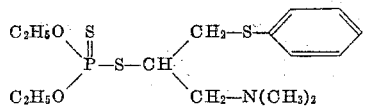

38 grams of diethyl-dithiophosphoric acid are dissolved in a solution of 13 grams of caustic potash in 100 ccm. methanol. There are added 45.7 grams 1-dimethylamino-3-thiophenyl-2-chloropropane at a temperature of about 60° C. Upon cooling to room temperature the precipitated potassium chloride is filtered off with suction and the methanol is removed by distillation in vacuo. The reaction product obtained is dissolved in ether and washed with water. The ether layer is separated, dried with sodium sulfate and the ether is removed by distillation. There are obtained 67 grams of the new ester as a yellow water-unsoluble oil. Yield: 85% of the theoretical.

A 0.01% solution of the new ester kills flies 100%. Caterpillars are killed completely with concentrations of 0.1%. 0.1% solutions of the ester show a systemic efficiency at living plants.

*Example 3*

Equimolecular amounts of 1-morpholino-3-thiophenyl-2-hydroxypropane and thionyl-chloride are dissolved in 2 parts by volume of methylene-dichloride in the cold. After standing over night the reaction is completed by gently warming to boiling. The 1-morpholino-3-thiophenyl-2-chloropropane is obtained in 91% yield B. P. 0.01 mm. Hg at 78° C.

21.2 grams diethyl-dithiophosphoric acid are dissolved in 100 ccm. of methanol together with 7.5 grams of caustic potash. Then there are added 30 grams 1-morpholino-3-thiophenyl-2-chloropropane at a temperature of about 25° C. The mixture is stirred for 6 to 7 hours at a temperature of about 65° C., then it is cooled to room temperature, the precipitated potassium chloride is filtered off with suction, and the methanol is removed by distillation in vacuo. The reaction product obtained is dissolved in ether and washed with water. After separating the ethereal layer and drying over sodium sulfate the ether is removed by distillation. There are obtained 43 grams of the new ester of the formula

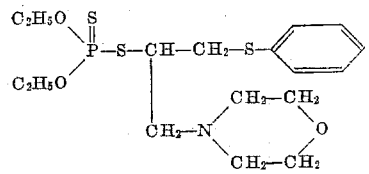

as a light yellow water-unsoluble oil. Yield: 92% of the theoretical.

*Analysis.*—Calculated: P=7.36%; S=22.8%; N=3.32%. Found: P=7.36%; S=23.0%; N=3.30%.

*Example 4*

Equimolecular amounts of 1-piperidino-3-thiophenyl-hydroxypropane and thionyl-chloride are dissolved in 2 parts by volume of methylene-dichloride in the cold. After standing over night the reaction is completed by gently warming to boiling. The 1-piperidino-3-thiophenyl-2-chloropropane is obtained in 91% yield; B. P. 0.01 mm. Hg at 78° C.

To 31.5 grams of the ammonium salt of the thiolphosphoric acid, which has been dissolved in 140 ccm. of ethanol (95%), there are added while stirring 41.0 grams 1-piperidino-3-thiophenyl-2-chloropropane. The temperature is kept for 21 hours at 65° C., then after cooling the separated ammonium chloride is filtered off. The solvent is removed from the filtrate by distillation in vacuo, the remaining reaction product is dissolved in 100 ccm. ether and washed with water. The separated ether layer is dried over sodium sulfate. After distilling off the ether in vacuo there remain 50 grams of the new ester of the formula

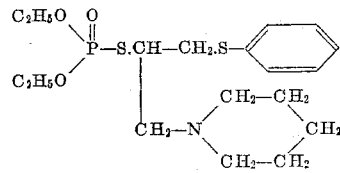

as a yellow water-unsoluble oil, which cannot even be distilled off in high vacuo. Yield: 82.5% of the theoretical.

*Analysis.*—Calculated: P=7.51%; S=15.89%; N=3.47%. Found: P=7.68%; S=15.84%; N=3.48%.

*Example 5*

29 grams diethyl-dithiophosphoric acid are dissolved in 120 ccm. methanol together with 9.5 grams caustic potash. Then there are added while stirring 41 grams 1-piperidino-3-thiophenyl-2-chloropropane at a temperature of about 50° C. The temperature is kept for 6 hours at 65° C. Upon cooling the separated potassium chloride is filtered off with suction. The methanol is removed from the filtrate by distillation in vacuo. The reaction product obtained is dissolved in 100 ccm. ether and washed with water. The ether layer is separated, dried over sodium sulfate and the ether is distilled off, the last part in high vacuo. There are obtained 56.6 grams of the new ester of the formula

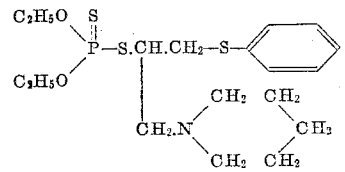

as a water-unsoluble light yellow oil. Yield: 90% of the theoretical.

*Analysis.* — Calculated: P=7.38%; S=22.89%; N=3.33%. Found: P=7.25%; S=22.53%; N=2.27%.

*Example 6*

Equimolecular amounts of 1-dimethylamino-3-thioethyl-2-hydroxypropane and thionyl-chloride are dissolved in 2 parts by volume of methylene-dichloride in the cold. After standing over night the reaction is completed by gently warming to boiling. The 1-dimethylamino-3-thioethyl-2-chloropropane is obtained in 91% yield; B. P. 0.01 mm. Hg at 78° C.

38.6 grams diethyl-dithiophosphoric acid are dissolved in 150 ccm. methanol together with 12.6 grams caustic potash. There are added while stirring at a temperature of about 40° C. 37.8 grams 1-dimethylamino-3-thioethyl-2-chloropropane. The reaction mixture is stirred for 8 hours at a temperature of about 60° C., then the potassium chloride is filtered off with suction and the methanol is removed from the filtrate by distillation in vacuo. The remaining reaction product is dissolved in 100 ccm. ether and washed with water. The ether layer is separated, dried over sodium sulfate and the ether is distilled off. The residue is fractionated in high vacuo. There are obtained 48.2 grams of the new ester of the formula

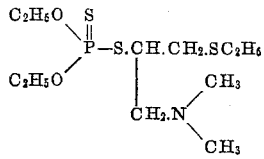

as a water-unsoluble clear oil; B. P. 0.01 mm. Hg at 93 to 94° C. Yield: 72.8% of the theoretical.

*Analysis.*—Calculated: P=9.35%; S=29.0%; N=4.22%. Found: P=9.35%; S=28.53%; N=4.20%.

*Example 7*

To 42.0 grams of the ammonium salt of the thiolphosphoric acid, which has been dissolved in 180 ccm. of a 96% alcohol, there are added while stirring 37.5 grams 1-dimethylamino-3-thioethyl-2-chloropropane. The mixture is kept for 24 hours at a temperature of about 60° C., and is then cooled to room temperature. The precipitated ammonium chloride is filtered off with suction and the solvent is removed from the filtrate by distillation in vacuo. The remaining reaction product is dissolved in 100 ccm. of ether and washed with water. After separating the water layer the ether extract is dried over sodium sulfate. After distilling off the ether the residue is fractionated in high vacuo. There are obtained 31.5 grams of the new ester of the formula

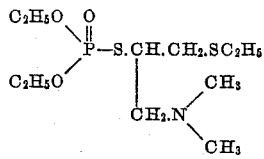

as a light yellow water-unsoluble oil; B. P. 0.01 mm. Hg at 111 to 112° C.; yield: 50.6% of the theoretical.

*Analysis.*—Calculated: P=9.78%; S=20.3%. Found: P=10.1%; S=20.6%.

What we claim is:
1. A thiophosphoric acid of the formula

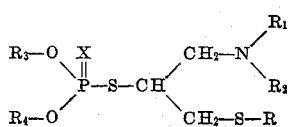

in which R stands for a member selected from the group consisting of lower alkyl groups and phenyl radicals

stands for a member selected from the group consisting of di-lower-alkylamino, piperidino and morpholino radicals R₃ and R₄ stand for a member selected from the group consisting of aliphatic radicals having from 1–4 carbon atoms, and X stands for a member selected from the group consisting of oxygen and sulfur.

2. A process for producing a thiophosphoric acid ester of the formula

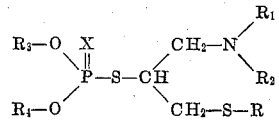

in which R stands for a member selected from the group consisting of lower alkyl groups and phenyl radicals

stands for a member selected from the group consisting of di-lower alkylamino, piperidino and morpholino radicals, R₃ and R₄ stand for a member selected from the group consisting of aliphatic radicals having from 1–4 carbon atoms, and X stands for a member selected from the group consisting of oxygen and sulfur, which comprises reacting a salt of a member consisting of the group selected from an O,O-dialkyl thiolophosphoric acid and O,O-dialkyl dithiophosphoric acid with a 2-halide propane of the formula

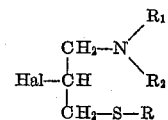

in which Hal stands for a halogen atom and R and

have the same meaning as above, at a temperature between about 0° and 100° C.

3. The process of claim 2 wherein the temperature is between about 20° C. and 80° C.

4. The process of claim 2 wherein the reaction is carried out in an inert solvent.

No references cited.